United States Patent
Shah et al.

(10) Patent No.: US 7,224,687 B2
(45) Date of Patent: May 29, 2007

(54) METHOD AND APPARATUS FOR VOICE OVER IP NETWORK ADDRESS TRANSLATION

(75) Inventors: Tushar Ramesh Shah, Lombard, IL (US); Gregory Scott Kutac, San Antonio, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 885 days.

(21) Appl. No.: 10/087,565

(22) Filed: Feb. 28, 2002

(65) Prior Publication Data

US 2003/0161295 A1    Aug. 28, 2003

(51) Int. Cl.
*H04L 12/66*    (2006.01)

(52) U.S. Cl. .................... 370/352; 370/401

(58) Field of Classification Search ........ 370/352–356, 370/389, 400, 401, 465, 466
See application file for complete search history.

(56) References Cited

U.S. PATENT DOCUMENTS

| | | | |
|---|---|---|---|
| 6,047,325 A | 4/2000 | Jain et al. ............. | 709/227 |
| 6,058,431 A | 5/2000 | Srisuresh et al. ....... | 709/245 |
| 6,266,707 B1 | 7/2001 | Boden et al. .......... | 709/245 |
| 6,304,753 B1 | 10/2001 | Hartmaier ............. | 455/413 |
| 6,822,957 B1 * | 11/2004 | Schuster et al. ........ | 370/389 |
| 6,954,790 B2 * | 10/2005 | Forslow .............. | 709/227 |
| 2003/0093481 A1 * | 5/2003 | Mitchell et al. ........ | 709/206 |
| 2003/0118002 A1 * | 6/2003 | Bradd et al. .......... | 370/352 |

OTHER PUBLICATIONS

Computer Telephony, "The New Centrex", Feb. 5, 2001, Downloaded from http://www.cconvergence.com/article/CTM20010202S0018.

Toga, J. and ElGebaly, H., "Demystifying Multimedia Conferencing Over the Internet Using the H.323 Set of Standards", Intel Technology Journal Q2'98, Downloaded from http://www.intel.com/technology/itj/q21998/articles/art_4.htm.

Paul F. Tsuchiya and Tony Eng, *Extending the IP Internet Through Address Reuse*, Computer Communication Review, ACM SIGCOMM, XP-002075152, pp. 16-33.

Heon Y. Yeom, Jungsoo Ha and Ilhwan Kim, *IP Multiplexing by Transparent Port-Address Translator*, Chicago, IL, XP 002046289, pp. 113-121, 1996.

* cited by examiner

*Primary Examiner*—Ajit Patel

(57) ABSTRACT

An IP services switch that supports packetized voice traffic in the form of voice packets from a plurality of enterprises having a plurality of endpoints some of which can use the same IP addresses. The IP services switch includes a plurality of NAT tables, each of which corresponds to a separate enterprise network for providing header and payload IP addresses which are unique to the services switch for the voice packets corresponding to each separate enterprise endpoint. A method of NAT in an intermediate service provider network for header and payload IP addresses in VoIP voice traffic packets is also provided.

18 Claims, 6 Drawing Sheets

METHOD AND APPARATUS FOR VOICE OVER IP NETWORK ADDRESS TRANSLATION

BACKGROUND OF THE INVENTION

The present invention relates to voice communications and more particularly to packetized voice communications transferred over an Internet Protocol (IP) packet network.

The traditional telephone network, known as the Public Switched Telephone Network (PSTN) is a vast network that carries voice traffic from phone to phone around the world. The PSTN is a circuit switched network which uses an array of switches to form a dedicated line connection extending between the phones for the duration of the call.

Packet networks operate differently than circuit switched networks, breaking up the data or voice traffic into small packets or datagrams which are sent independently across the packet network. A dedicated line is not established between endpoints in a packet network and the separate packets may travel different routes through the network to reach the destination.

Voice traffic can also be sent from phone to phone using a combination of both packet networks and the PSTN. Service providers effectively utilize the benefits of both networks by providing an intermediate managed network 10 shown in FIG. 1 which connects customers to both the PSTN 12 and a global packet network 14, such as the Internet. Customers can have one or more enterprises 15 each having a private network 16 connected to the managed network 10. Each enterprise can include a plurality of endpoints 18 which may be phones, computers, software controlled phones called softphones or any other known endpoints.

The managed network 10 offers customer enterprises 15 a variety of voice and data services at lower costs. For example, toll charges associated with establishing a dedicated line connection can be avoided using a packet network. Also, compression techniques enable packetized voice traffic to be transferred over the PSTN 12 using less bandwidth than typical PCM voice signals.

To move voice traffic over packet networks 10, 14, 16, voice conversations are digitized and packetized. The voice packets are identified for proper routing over the packet network using a known packetization format generally known as Voice over Internet Protocol (VoIP). VoIP uses IP addressing schemes to uniquely identify the source and destination endpoint addresses.

Public IP addresses are unique addresses on the global IP network. However, there are a limited number of unique public IP addresses available according to the IP address format defined by Request for Comments (RFC) 791 (Internet Architecture Board). In order to conserve IP addresses, enterprises 15 which administer their own private networks 16 can use private IP addresses. Separate private networks 16 can use the same private addresses. The private addresses uniquely identify the endpoints within the private network, but are not unique to the global IP packet network 14 and perhaps the managed network 10.

However, to interconnect these private networks 16 address resolution is needed to eliminate addressing conflicts since endpoints 18 from different enterprises 15 may be using the same IP address. Network Address Translation (NAT) has been used for data traffic such as emails, web browsing, etc. to translate between private and public IP addresses to enable private and public networks to be interconnected.

VoIP presents new challenges for NAT, since VoIP traffic packets have IP addresses embedded in the payloads of the packet envelope. Previously, VoIP NAT has been done using a dedicated NAT device, such as a router or firewall 19, located at each enterprise site. However this approach becomes increasingly more difficult and costly to implement as more private networks 16 are serviced by the managed IP network 10 and as more VoIP protocols are implemented in the industry.

Accordingly, it is desirable to provide VoIP NAT which is scalable and less costly to implement for a large number of private networks 16 connected to intermediate networks such as those managed by service providers.

SUMMARY OF THE INVENTION

According to the present invention, an IP services switch that supports packetized voice traffic in the form of voice packets from a plurality of enterprises having a plurality of endpoints is provided. More than one enterprises can use the same private IP addresses. The IP services switch includes a plurality of NAT tables, each of which corresponds to a separate enterprise private network for providing header and payload IP address translations which are unique to the IP services switch for the voice packets corresponding to each separate enterprise endpoint.

In accordance with another aspect of the invention, a method of NAT in an intermediate service provider network for IP voice traffic packets corresponding to a plurality of private networks is provided. The private networks include a plurality of endpoints having private IP addresses and more than one of the private networks can use at least some of the same non-unique private IP addresses. The method includes providing a virtual router having first and second NAT tables, receiving VoIP packets from a first private network having headers and payloads with non-unique private IP addresses, and translating the private header and payload IP addresses to IP addresses which are unique to the intermediate network using the first NAT table. The method also includes receiving VoIP packets from a second private network having headers and payloads with non-unique private IP address, and translating the private header and payload IP addresses to IP addresses which are unique to the intermediate network using the second NAT table.

Other features, benefits and advantages of this invention will become apparent to those skilled in the art from the following detailed description of the preferred embodiments, when read in light of the accompanying drawings.

BRIEF DESCRIPTION OF THE DRAWINGS

The invention may take form in certain components and structures, preferred embodiments of which will be illustrated in the accompanying drawings wherein.

DETAILED DESCRIPTION OF THE INVENTION

It is to be understood that the specific devices and processes illustrated in the attached drawings, and described in the following specification are simply exemplary embodiments of the inventive concepts defined in the appended claims. Hence, specific protocols and other characteristics relating to the embodiments disclosed herein are not to be considered as limiting.

Figure 1:
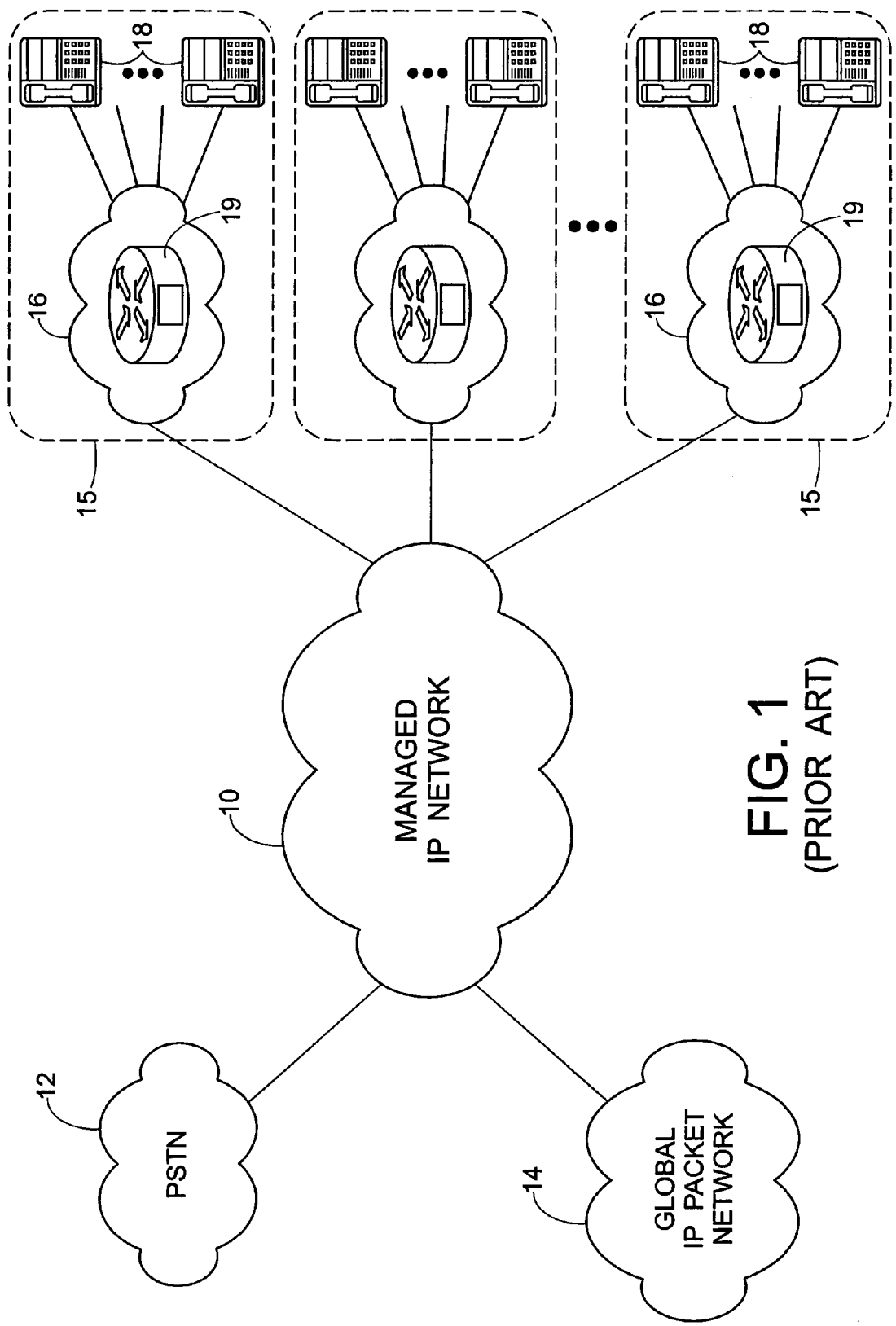
FIG. 1 is a block diagram of a conventional service provider offering VoIP services to a plurality of enterprises wherein each enterprise includes a standalone dedicated machine for doing NAT.
Figure 2:
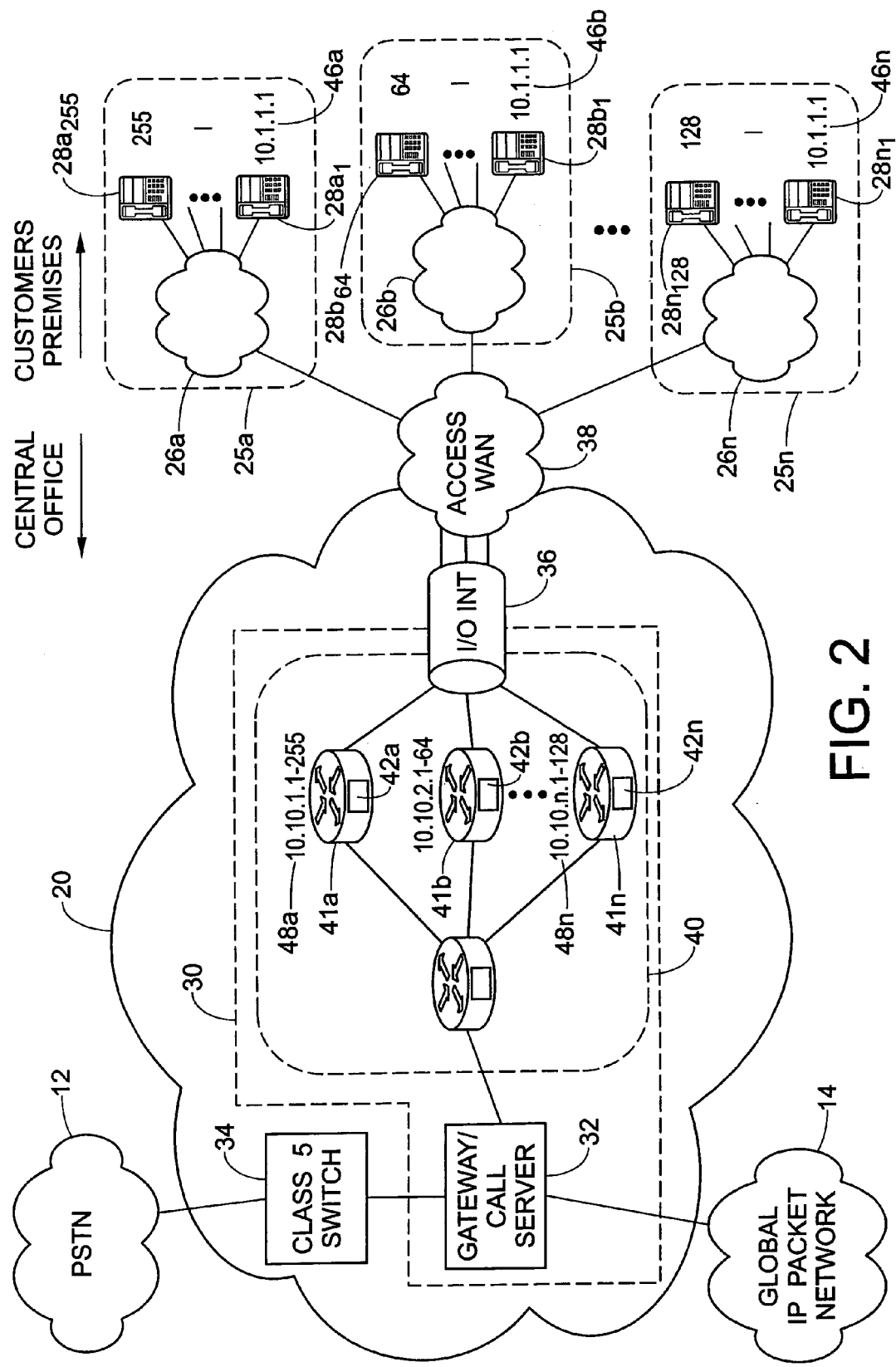
FIG. 2 is a block diagram of a service provider having a virtual router for doing NAT for several enterprise private networks in accordance with the invention.

Referring to FIG. 2, a service provider network is shown generally at 20 for providing managed IP voice and data services to a plurality of customer enterprises 25a-25n. Each enterprise 25a-25n includes an enterprise private network 26a-26n having plurality of endpoints 28a-28n. The endpoints 28a-28n can be any known telephones capable of IP telephony, including but not limited to dedicated IP telephones or Personal Computers (PC's) running a software application which allows the PC to perform the functions of an IP phone. For example, enterprise private network 26a includes two hundred and fifty five endpoints $28a_1$-$28a_{255}$, and enterprise private network 26b includes sixty four endpoints $28b_1$-$28b_{64}$.

The service provider network 20 is an intermediate packet network connecting the enterprise private networks 26a-26n to the global IP packet network 14, such as the Internet, and the PSTN 12. The service provider network 20 includes a central office 30 with an IP services switch 40 having internal virtual routers 41a-41n that supports packetized voice traffic in the form of voice packets from a plurality of enterprise private networks 26a-26n. In the example provided herein, the service provider network 20 includes a single central office 30 having a single intermediate network. Alternatively, the service provider network 20 may includes a plurality of central offices 30 each corresponding to an intermediate network.

The service provider network 20 also includes a known Media Gateway and Call Server 32, which can be any known Gateway/Call Server such as for example an iMerge® Centrex Feature Gateway made by AG Communication Systems of Phoenix Ariz., a subsidiary of Lucent Technologies. A class 5 switch 34 is used to connect the intermediate network 20 to the PSTN 12 in a known manner. Alternatively, a class 4 switch can be used in place of the class 5 switch 34.

The IP services switch 40 includes a plurality of NAT tables 42a-42n each managed by a separate virtual router 41a-41n. Each NAT table 42a-42n is stored in a separate memory space of the IP services switch 40 and corresponds to a separate enterprise private network 26a-26n. The IP services switch 40 also includes a known Input/Output (I/O) device 36 for connecting each virtual router 41a-41n with the corresponding enterprise network 26a-26n via a known Wide Area Network 38.

Each customer provides the service provider with the private IP addresses the customer will use on each of the customer's private enterprise networks 26a-26n. The service provider does not need to administer the customer private IP addresses, this is done by each individual customer. The customer IP addresses can be public addresses, although more commonly they will be private IP addresses. More than one customer may use the same private IP addresses.

The service provider creates NAT assignments for each NAT table, assigning intermediate IP addresses to the corresponding private IP addresses used in the customer's private enterprise networks 26a-26n. The assignments can be static assignments using 1:1 assignments of one intermediate IP address from a static pool of IP addresses for each private IP address. Alternatively, the assignments can be dynamic, pulling the intermediate IP addresses from a dynamic pool of IP addresses which does not contain the same number of intermediate IP addresses as the number of private IP addresses. In dynamic addressing, when an intermediate IP address is no longer used, for example the call is completed, the IP address is used again for translating a different private IP address used in a different call.

Each NAT table 42a-42n translates the private IP addresses 46a-46n in both the header and the payload of the VoIP traffic of the corresponding enterprise private network 26a-26n into an intermediate header and payload IP address 48a-48n for use by the intermediate service provider network 20. Further, each NAT table 42a-42n translates both the header and the payload intermediate network IP addresses 48a-48n of the VoIP traffic corresponding to the service provider network 20 into the header and payload private IP addresses 46a-46n of the corresponding enterprise private networks 26a-26n. The invention can use any known protocol for VoIP NAT translations including but not limited to H.323v1, H.323v2, MGCP, H.248 and SIP.

Still referring to FIG. 2, the enterprise private network 26a includes 255 endpoints $28a_1$-$28a_{255}$ each having a separate private address of 10.1.1.1-10.1.1.255 as shown at 46a. The IP services switch includes a NAT table 42a which corresponds to the enterprise private network 26a. The NAT table 42a translates the addresses 10.1.1.1-10.1.1.255 of the endpoints $28a_1$-$28a_{255}$ into intermediate addresses 10.10.1.1-10.10.1.255 as shown at 48a for VoIP traffic coming from the private network 26a going to the intermediate network 20 (which may be going to the PSTN, the global network 14, or to another private network 26a-26n). The NAT table 42a also translates the intermediate addresses 10.10.1.1-10.10.1.255 into the private addresses 10.1.1.1-10.1.1.255 of the endpoints $28a_1$-$28a_{255}$ for VoIP traffic coming from the intermediate network 20 (which may have previously come from the PSTN 12, the global network 14, or another private network 26a-26n) going to the private network 26a. The invention allows each enterprise private network 26a-26n to use any suitable known private IP addressing scheme, providing the advantage that enterprises 25a-25n do not need to change their existing private addresses 46a-46n already in use.

Figure 3:
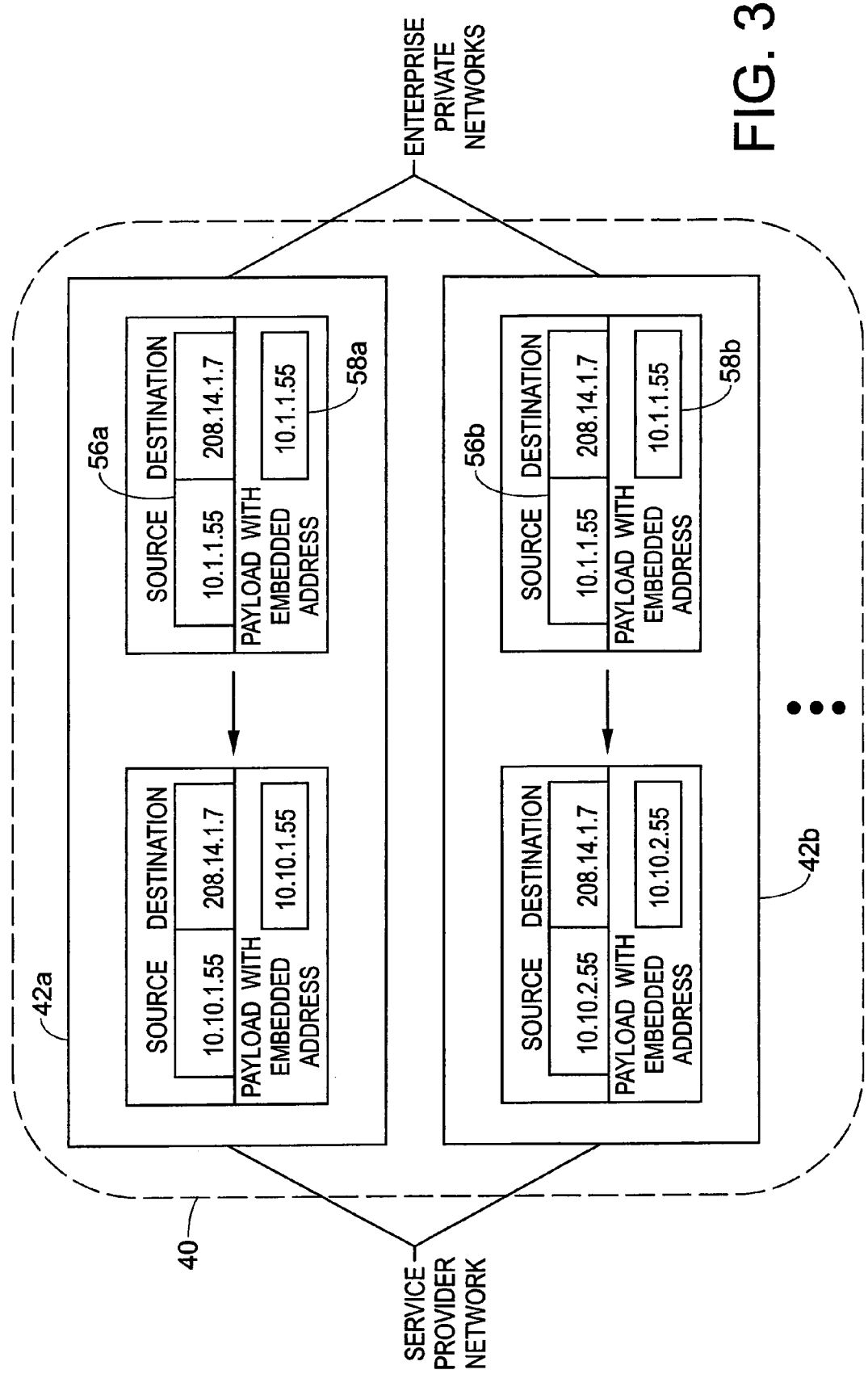
FIG. 3 is a block diagram illustrating NAT of header and payload enterprise private IP addresses to intermediate private IP header and payload addresses.
Figure 4:
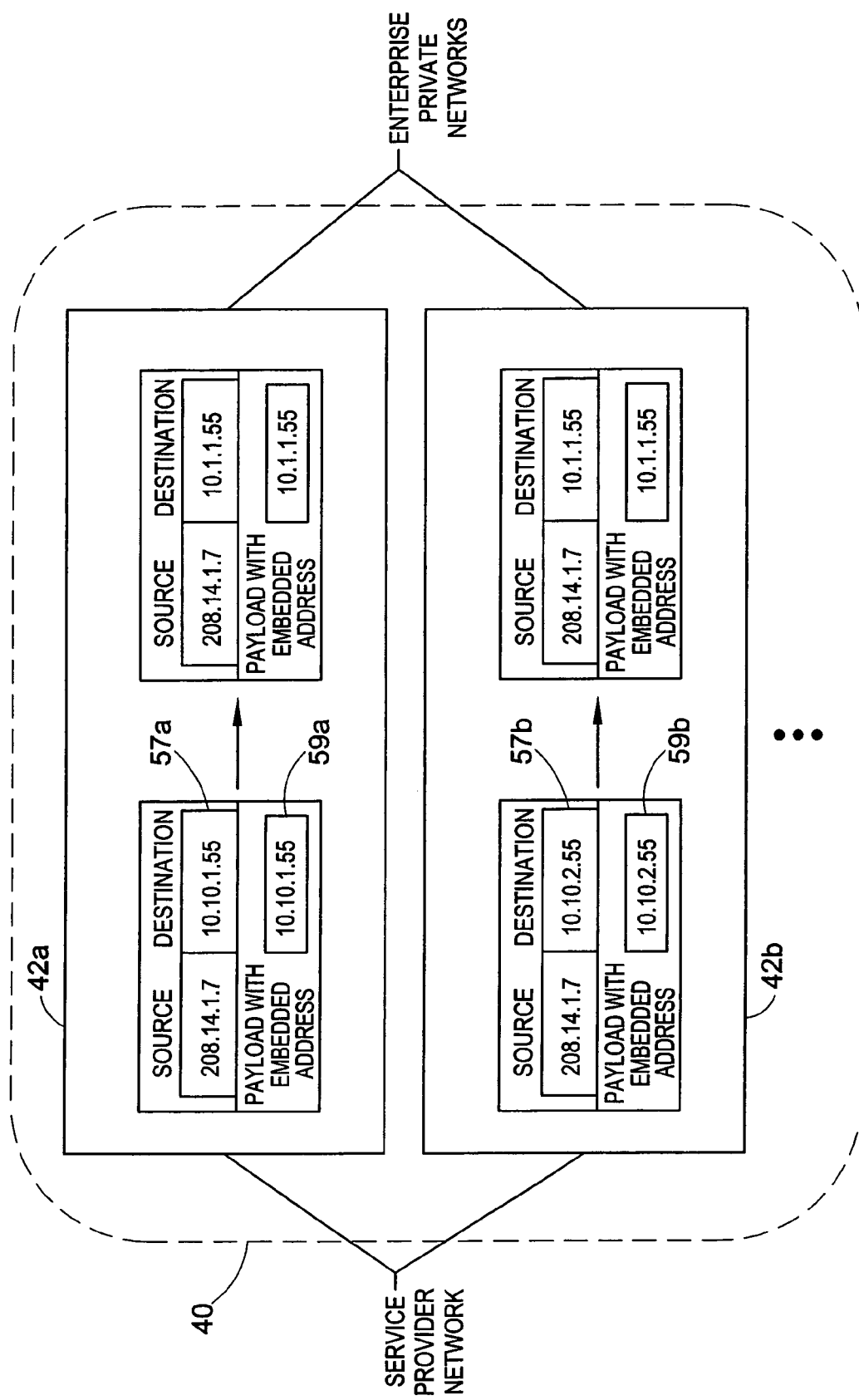
FIG. 4 is a block diagram illustrating NAT of header and payload intermediate private IP addresses to enterprise private addresses in accordance with the invention.

Referring to FIGS. 3 and 4, the invention also provides IP address conflict resolutions when enterprise private networks 26a-26n using the same private IP addresses are connected to the service provider's intermediate network 20. In FIG. 3, two endpoints $28a_{55}$ and $28b_{55}$, from private networks 26a and 26b respectively, each use the same private IP addresses 10.1.1.55. In an example of communication from the enterprise private networks 26a-26n, such as a call setup, both endpoints $28a_{55}$ and $28b_{55}$ communicate with the Gateway/Call Server 32 which for the purposes of this example has a destination address of 208.14.1.7. However, since both endpoints use the same private addresses as source addresses 56a, 56b, and 58a, 58b, NAT is needed to resolve this conflict.

The IP services switch 40 includes virtual router 41a having NAT table 42a corresponding to the private enterprise network 26a for providing NAT for both the header source IP address 56a and the payload source IP address 58a corresponding to endpoint $28a_{55}$. The private source IP address of 10.1.1.55 is translated to the intermediate source IP address of 10.10.1.55 in any suitable known manner.

Further, the IP services switch 40 includes virtual router 41b having NAT table 42b corresponding to the private network 26b for providing NAT for both the header source address 56b and the payload source address 58b corresponding to endpoint $28b_{55}$. The private source IP address of 10.1.1.55, which is same private address as that used by $28a_{55}$, is translated to the intermediate source IP address of 10.10.2.55 in any suitable known manner. The intermediate source IP addresses 10.10.1.55 and 10.10.2.55 are each unique to the intermediate network thus resolving the addressing conflict. In this example, these addresses are private to the intermediate network 20 and are not unique to the global IP packet network 14.

In FIG. 4, when the Gateway/Call Server 32 responds back to the endpoints $28a_{55}$ and $28b_{55}$ the source and destination are switched, that is, the intermediate private addresses 10.10.1.55 and 10.10.2.55, identifying endpoints $28a_{55}$ and $28b_{55}$ respectively, become destination addresses. The NAT tables 42a and 42b translate the private intermediate destination addresses for both the header destination addresses 57a and 57b and the payload destination addresses 59a and 59b to the enterprise private network IP addresses corresponding to endpoints $28a_{55}$ and $28b_{55}$.

Figure 5:
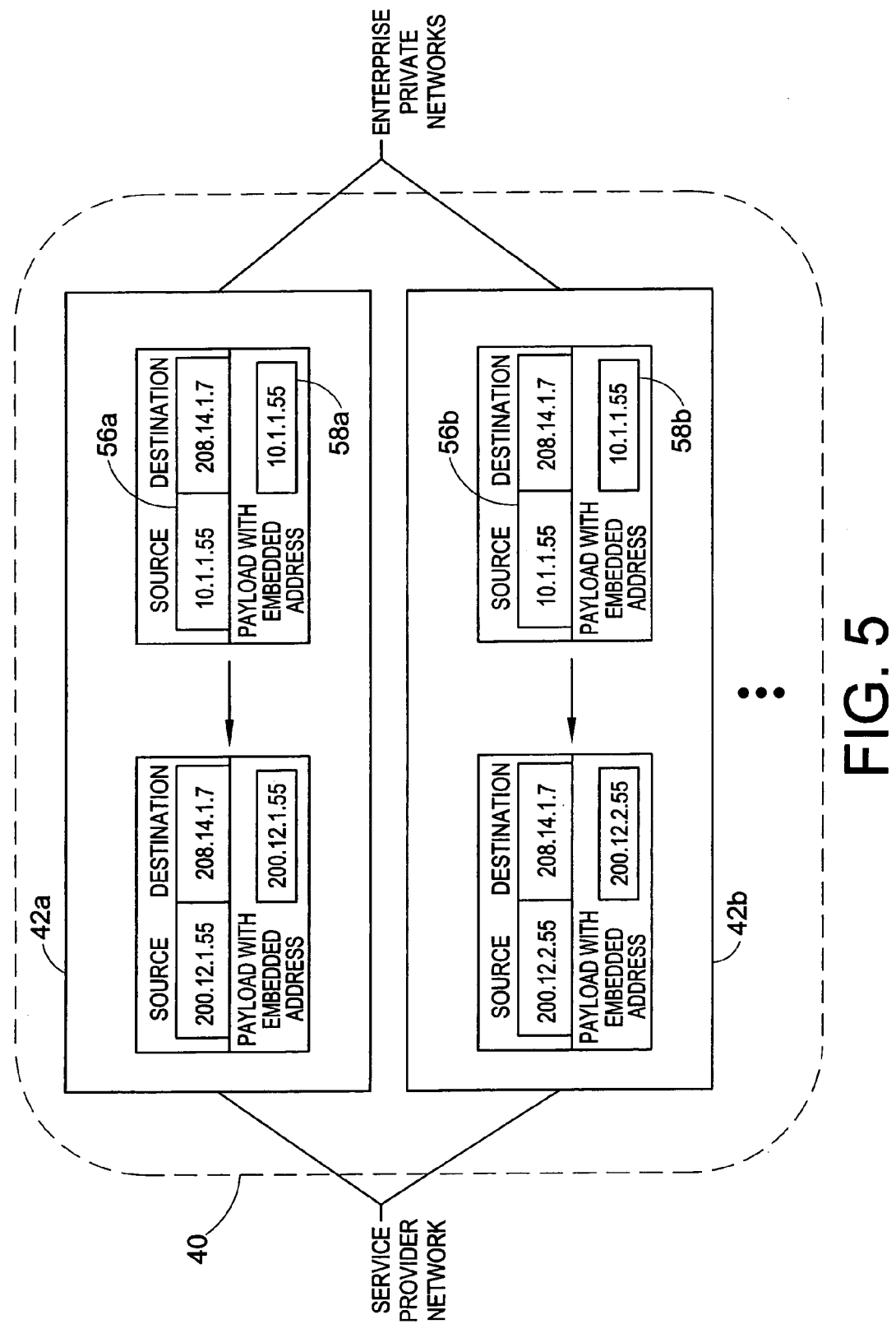
FIG. 5 is a block diagram illustrating NAT of header and payload enterprise private IP addresses to public IP addresses in accordance with the invention.

In the examples shown in FIGS. 3 and 4, the invention uses private intermediate IP addresses which are not unique on the global IP packet network 14. Alternatively, according to a second embodiment of the invention shown in FIGS. 5 and 6, the IP services switch 40 of the invention can use public intermediate IP addresses which are unique to both the intermediate IP network 20 and the global IP packet network 14. For example, in FIG. 5, when communicating from the enterprise private network endpoints $28a_{55}$ and $28b_{55}$, both using the same IP address 10.1.1.55 as a destination address, to the Gateway/Call Server 32, the NAT tables 42a and 42b translate the common private source addresses to the public IP source addresses of 200.12.1.55 and 200.12.2.55 respectively. This NAT is done for both the source IP header addresses 56a and 56b and the source IP payload address 58a and 58b.

Figure 6:
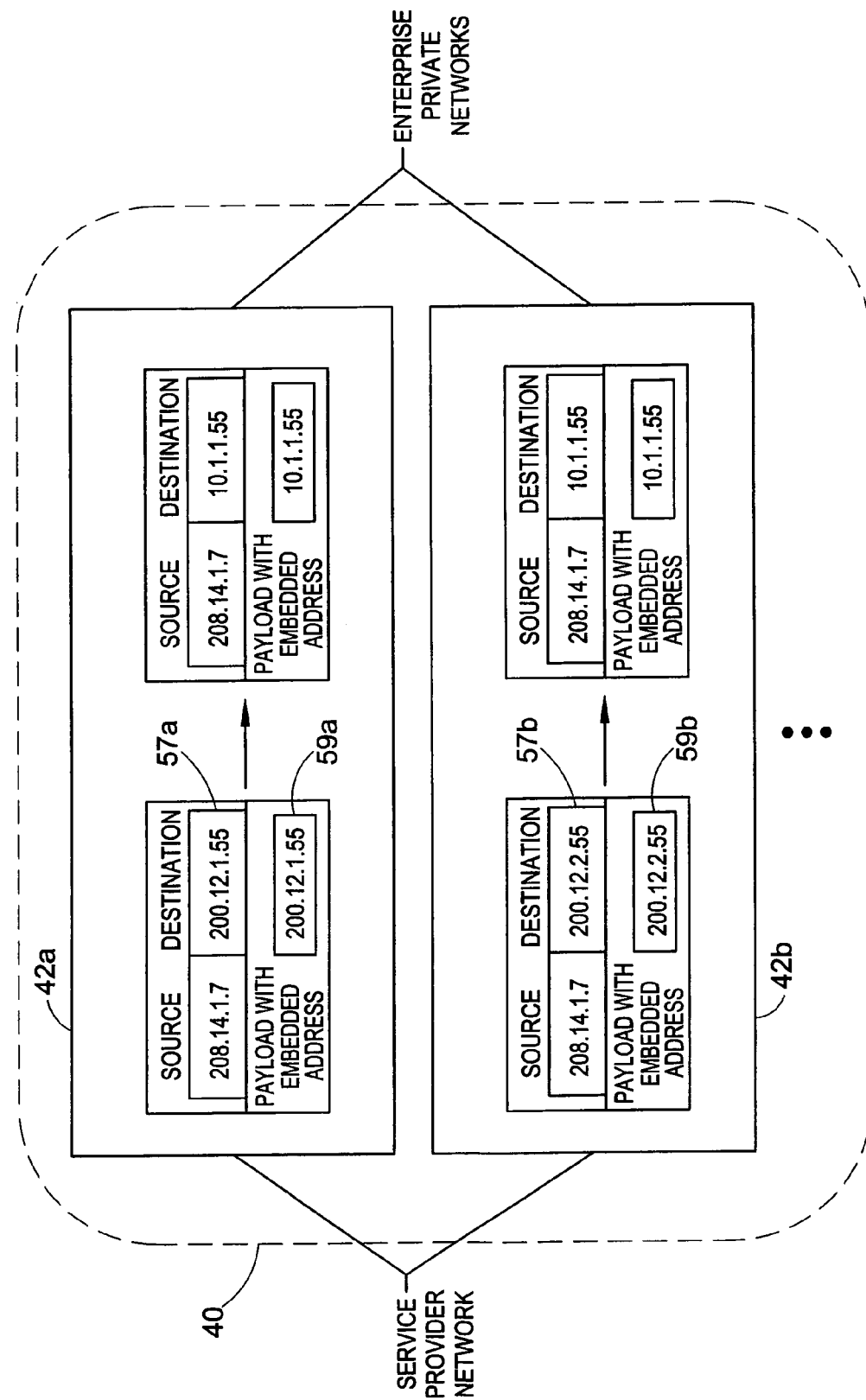
FIG. 6 is a block diagram illustrating NAT of header and payload public IP addresses to enterprise private IP addresses in accordance with the invention.

In FIG. 6, when communicating from the Gateway/Call Server 32 in the service provider's intermediate network 20 to the private networks endpoints $28a_{55}$ and $28b_{551}$ the NAT tables 42a and 42b translate the public IP source addresses of 200.12.1.55 and 200.12.2.55 to the same destination addresses 10.1.1.55 for both endpoints $28a_{55}$ and $28b_{55}$. This NAT is done for both the destination IP header addresses 57a and 57b and the destination IP payload address 59a and 59b.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

We claim:

1. An Internet Protocol (IP) services switch that supports packetized voice traffic in the form of voice packets from a plurality of enterprises, wherein each enterprise has a plurality of endpoints and more than one enterprise uses the same IP addresses, the IP services switch comprising:
a plurality of Network Address Translation (NAT) tables routing the voice packets, each of said NAT tables corresponding to a separate enterprise for providing header IP addresses and payload IP addresses which are unique to the services switch for voice packets corresponding to each separate enterprise endpoint.

2. The Internet Protocol (IP) services switch defined in claim 1 wherein the unique header and payload IP addresses come from a static pool of IP addresses.

3. The Internet Protocol (IP) services switch defined in claim 1 wherein the unique header and payload IP addresses come from a dynamic pool of IP addresses.

4. The IP services switch defined in claim 1 wherein the unique header and payload IP addresses are private to the service provider.

5. The IP services switch defined in claim 1 wherein the unique header and payload IP addresses are public addresses.

6. The P services switch defined in claim 1 wherein the unique header and payload IP addresses are source addresses.

7. A Voice Over Internet Protocol (VoIP) application-aware Internet Protocol (IP) services switch for providing Network Address Translation (NAT) for VoIP packets moving between enterprise private networks and a service provider intermediate network, wherein the enterprise private networks include a plurality of endpoints having private IP addresses which are not unique to the service provider intermediate network, the IP services switch comprising:
a first NAT table stored in a first memory space for providing NAT routing VoIP packets having header and payload IP addresses corresponding to a first enterprise private network; and
a second NAT table stored in a second memory space routing providing NAT for VoIP packets having header and payload IP addresses corresponding to a second enterprise private network.

8. The VoIP application-aware IP services switch defined in claim 7 wherein the first and second NAT tables translate the private enterprise network header and payload addresses to header and payload addresses which are unique to the service provider intermediate network.

9. The VoIP application-aware IP services switch defined in claim 8 wherein the unique header and payload IP addresses are private IP addresses to the service provider intermediate network.

10. The VoIP application-aware IP services switch defined in claim 8 wherein the unique header and payload IP addresses are public IP addresses.

11. The VoIP application-aware IP services switch defined in claim 7 wherein the first and second NAT tables translate header and payload IP addresses unique to the service provider intermediate network to the private enterprise network header and payload IP addresses.

12. The VoIP application-aware IP services switch defined in claim 11 wherein the unique header and payload IP addresses are private IP addresses to the service provider intermediate network.

13. The VoIP application-aware IP services switch defined in claim 11 wherein the unique header and payload IP addresses are public IP addresses.

14. A method of Network Address Translation (NAT) in an intermediate service provider network for Internet Protocol (IP) voice traffic packets corresponding to a plurality of private enterprise networks, wherein the private enterprise networks include a plurality of endpoints having private IP addresses and more than one of the private networks use at least some of the same non-unique private IP addresses, the method comprising:

providing an IP services switch having first and second NAT tables;
receiving VoIP packets from a first private enterprise network having headers and payloads with non-unique private IP addresses;
translating the private header and payload IP addresses to IP addresses unique to the intermediate network using the first NAT table;
receiving VoIP packets from a second private enterprise network having headers and payloads with non-unique private IP addresses; and
translating the private header and payload IP addresses to IP addresses unique to the intermediate network using the second NAT table.

15. The method of NAT defined in claim 14 wherein the unique header and payload IP addresses are private to the service provider intermediate network.

16. The method of NAT defined in claim 14 wherein the unique header and payload IP addresses are public addresses.

17. The method of NAT defined in claim 14 wherein the unique header and payload IP addresses are source addresses.

18. The method of NAT defined in claim 14 wherein the unique header and payload IP addresses are destination addresses.

* * * * *